United States Patent [19]

Fischer et al.

[11] Patent Number: 5,061,558
[45] Date of Patent: Oct. 29, 1991

[54] METHACRYLATE PROTECTIVE COATING CONTAINING A UV-ABSORBER FOR POLYCARBONATE

[75] Inventors: Jens-Dieter Fischer, Darmstadt; Manfred Munzer, Bensheim; Ursula Golchert; Felix Schinzel, both of Darmstadt, all of Fed. Rep. of Germany

[73] Assignee: Rohm GmbH Chemische Fabrik, Darmstadt, Fed. Rep. of Germany

[21] Appl. No.: 432,383

[22] Filed: Nov. 6, 1989

[30] Foreign Application Priority Data

May 11, 1988 [DE] Fed. Rep. of Germany ....... 3837589

[51] Int. Cl.$^5$ .................. B32B 27/08; B32B 27/30; B32B 27/18
[52] U.S. Cl. ................... 428/332; 428/412; 428/473.5; 428/474.4; 428/475.2; 264/176.1; 427/160; 427/412.5
[58] Field of Search .................. 428/412, 332, 473.5, 428/474.4, 475.2

[56] References Cited

U.S. PATENT DOCUMENTS 3,582,398 6/1971 Ringler .
4,666,779 5/1987 Curry .................................. 428/412

FOREIGN PATENT DOCUMENTS 0110238  6/1984  European Pat. Off. .
0203487 12/1986  European Pat. Off. .
1694273  8/1971  Fed. Rep. of Germany .
3244953  6/1984  Fed. Rep. of Germany .
3709562 10/1988  Fed. Rep. of Germany .
3719239 12/1988  Fed. Rep. of Germany .
2028228  3/1980  United Kingdom .

OTHER PUBLICATIONS

*Chemical Abstracts*, (1989), vol. 110, 155753M, "Acrylate Polymer-Laminated Protective Films" H. Kazuhiko et al.

*Primary Examiner*—P. C. Sluby
*Attorney, Agent, or Firm*—Oblon, Spivak, McClelland, Maier & Neustadt

[57] ABSTRACT

Multilayered plastic objects are prepared having a core layer of an aromatic polycarbonate in contact with a polymethacrylate film containing a UV absorber. The polymethacrylate film comprises a copolymer of methylmethacrylate and an acrylic or methacrylic ester, (meth)acrylamide, maleimide or mixtures thereof and is compatible with said aromatic polycarbonate at all mixing ratios.

15 Claims, No Drawings

METHACRYLATE PROTECTIVE COATING CONTAINING A UV-ABSORBER FOR POLYCARBONATE

BACKGROUND OF THE INVENTION

1. Field of the Invention

This invention relates to multilayered plastic molded objects that consist predominantly of an aromatic polycarbonate, and that are provided with a polymethacrylate plastic film containing a UV absorber on their surface as protection against the action of UV radiation.

2. Discussion of the Background

Polycarbonate plastics have only limited weather resistance. They are particularly damaged by UV radiation, which is manifested by originally glossy surfaces becoming dull The dulling is the visible symptom of macromolecular degradation caused by the UV radiation with the formation of a number of extremely fine hairline cracks beginning in the plastic surface. UV absorbers introduced into the plastic are able to protect the interior of the plastic object, for example a plastic sheet made of polycarbonate, but not the surface. To protect the surface, a varnish film of polymethyl methacrylate which also contains a UV absorber is applied from a solution of these protective film components according to DE 1,694,273 (U.S. Pat. No. 3,582,398).

U.S. Pat. No. 4,666,779 also describes UV-stabilized objects made of thermoplastic substrates, particularly those made of polycarbonates with a protective film of a copolymer that consists essentially of methyl methacrylate units and 0.5 to about 10% of the number of monomer units of other methacrylate units, specifically ethyl methacrylate, n-butyl methacrylate, iso-butyl methacrylate, or mixtures of these, and also 0 to 5% of the number of monomer units of other $\alpha,\beta$-unsaturated monomer units. The polymethacrylate protective film is coated on the substrate as a solution, with the low molecular weight UV stabilizers needed for UV stabilization being applied with the polymer-solvent system.

According to DE-A 28 32 676, a polymethyl methacrylate film with an adequate content of a UV absorber is applied during the manufacture of a polycarbonate plastic sheet by coextrusion. According to DE-A 32 44 953 (EP-A 110 238), an improved composite object is obtained by applying still another topcoat of polymethyl methacrylate or (meth)acrylate copolymers essentially containing little UV absorber to the plastic film containing the UV absorber, which can be polymethyl methacrylate or polycarbonate, by a multiple-component extrusion process.

In all cases described in the art, polymethacrylate plastics, particularly polymethyl methacrylate or copolymers of methyl methacrylate and lesser amounts of $C_2$-$C_4$-alkyl methacrylates are preferably used for the topcoat containing UV absorbers, because they have high weathering resistance and their surfaces are damaged less by UV radiation than those polycarbonates.

The drawback of known polymethacrylate topcoats containing UV absorbers for polycarbonate plastics is that they adhere inadequately to the polycarbonate being covered. This characteristic can lead to the topcoat detaching at least partially from the polycarbonate core, whereby its UV protection is lost. The detachment of such topcoats is promoted by both thermal and mechanical stresses, for example during the bending of multilayered plastic molded objects. The loss of UV protection leads to the molecular degradation of the polycarbonate plastic object and thus to the loss, or at least to the reduction of its mechanical properties.

In addition, plastic objects are also disclosed by U.S. Pat. No. 4,576,870 and EP-A 0 203 487 in which the UV absorbing protective film is a copolymer of essentially (meth)acrylic ester monomers with monomers containing UV-protective groups. These protective films are generally even more brittle than the protective films containing low molecular weight UV absorbers described above.

SUMMARY OF THE INVENTION

Accordingly, one object of the present invention is to provide multilayered plastic molded objects that consist predominantly of polycarbonate and that show durable adhesion at least between the polycarbonate plastic and the polymethacrylate film containing a UV absorber applied directly to the polycarbonate for its permanent protection and a process for their preparation.

DETAILED DESCRIPTION OF THE PREFERRED EMBODIMENTS

It has now been found that multilayered plastic molded objects based on polycarbonate with a polymethacrylate film containing a UV absorbers applied to them show durable adhesion when the polymethacrylate plastic film consists of methacrylate copolymers that form compatible (miscible) mixtures with polycarbonate, particularly the polycarbonate from Bisphenol-A.

The multilayered plastic molded objects of the present invention comprise a core layer consisting of more than 50 wt. % aromatic polycarbonate and a thermoplastic polymethacrylate film containing a UV absorber applied to the core. The polymethacrylate film may also be coated with other films. The objects of the present invention are characterized by the fact that the polymethacrylate plastic comprises (A) 0.01 to 50 wt. % of a UV absorber with a molecular weight $M_W \leq 5000$ and (B) 99.99 to 50 wt. % of a methacrylate copolymer made up of (b1) 99.9 to 5 wt. %, preferably 95 to 20 wt. % methyl methacrylate monomer units, and optionally other $\alpha,\beta$-unsaturated monomer units in amounts of 0 to 40 wt. % and (b2.1) of 0.1 to 95 wt. %, preferably 5 to 80 wt. % acrylic and/or methacrylic ester monomer units containing carbocyclic groups from monomers of Formula I

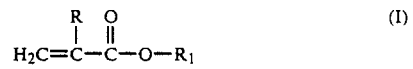

wherein R stands for H or $CH_3$ and $R_1$ stands for Y or A-Y, with Y being a cycloalkyl group or a singly or multiply alkyl-substituted cycloalkyl group having 5 to 12 atoms, or an optionally alkyl-substituted or oxyalkyl-substituted aryl group with 6 to 12 carbon atoms, and A is an alkylene group, which may be branched, having 1 to 6 carbon atoms, or an oxyalkylene group with 2 to 4 carbon atoms, and/or (b2.2) 0.1 to 95, preferably 5 to 25 wt. % of monosubstituted (meth)acrylamide monomer units from monomers of the Formula II

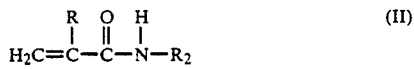

wherein R stands for H or CH₃ and R₂ stands for a cyclic organic group, optionally substituted with an aliphatic or aromatic group with 5 to 12 carbon atoms, and/or (b2.3) 0.1 to 95, preferably 5 to 40 wt. % maleimide monomer units from monomers of Formula III

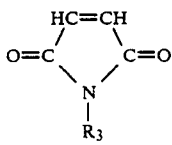

wherein R₃ stands for a cycloalkyl group or a substituted cycloalkyl group, substituted with alkyl groups having 1 to 6 carbon atoms or with a phenyl group, where the cyclic groups of $R_1$, $R_2$, and $R_3$ exhibit substantially no absorption of visible light down to ultraviolet radiation of 340 nm wavelength. The copolymer (B) should have a molecular weight $M_W < 30,000$, and be thermoplastically processable, and a mixture of the aromatic polycarbonate (PC) and copolymer (B) should be compatible in any ratio and have a lower critical solution temperature (LCST) of $\geq 120°$ C.

The UV-absorbing polymethacrylate coating pursuant to the invention having good adhesion to the polycarbonate plastic can be applied to the aromatic polycarbonate plastic to be protected by conventional methods such as coextrusion and varnishing. If necessary, the polymethacrylate coating can also be coated with another topcoat, for example a weather-resistant polymethyl methacrylate film. This film can be applied at the same time as the other films during the coextrusion, or can also be applied by subsequent varnishing, for example including a scratch-resistant coating based on silicone resin or crosslinked polyacrylates.

The methacrylate copolymers (B) are inherently thermoplastically processable to obtain glass-clear, colorless compositions. Such methacrylate copolymers (B) are essentially described in German Patent Application P 37 19 239.6 with comonomers of Formula I, in DE-OS 36 32 946 (U.S. Pat. No. 4,749,749) with comonomers of Formula II, and in German Patent Application P 37 09 562.5 with comonomers of Formula III.

Examples of acrylic and methacrylic ester comonomers of Formula I, i.e., with carbocyclic groups in the ester moiety, are cyclopentyl methacrylate, cyclohexyl acrylate, cyclohexyl methacrylate, 3,3,5-trimethylcyclohexyl methacrylate, 4-t-butylcyclohexyl acrylate, 4-t-butylcyclohexyl methacrylate, 3-cyclohexylpropyl methacrylate, phenyl methacrylate, 4-t-butylphenyl methacrylate, 4-methoxyphenyl methacrylate, benzyl methacrylate, 1-phenylethyl methacrylate, 2-phenylethyl acrylate, 2-phenylethyl methacrylate, 3-phenylpropyl acrylate, 3-phenylpropyl methacrylate, 2-phenoxyethyl methacrylate, and 2-naphthyl methacrylate.

Examples of acrylamides and methacrylamides which may be present in the polymethacrylate resin as comonomers of Formula II are N-cyclohexylacrylamide, N-cyclohexylmethacrylamide, N-2-methylcyclohexylmethacrylamide, N-phenylmethacrylamide, and N-benzylmethacrylamide.

Examples of maleimide comonomers of Formula III are N-cyclohexylmaleimide, N-2-methylcyclohexylmaleimide, N-4-methylcyclohexylmaleimide, N-3,3,5-trimethylcyclohexylmaleimide, N-4-ethylcyclohexylmaleimide, N-2-t-butylcyclohexylmaleimide, N-4-t-butylcyclohexylmaleimide, and N-2-phenylcyclohexylmaleimide.

The methacrylate copolymers described in the patents identified above give completely compatible polymer blends with aromatic polycarbonate, especially the polycarbonate from Bisphenol A, which are distinguished by high transparency.

The polycarbonate (PC) plastic

The plastic objects of to the invention consist predominantly of the aromatic polycarbonate to be protected against UV light.

The aromatic polycarbonates, which are used industrially are preferably polycarbonates of Bisphenol A. Polycarbonates of Bisphenol A are glass-clear, tough plastics, and are marketed, for example, under the name Makrolon ®. The molecular weights ($M_W$) in grams per mole, of the carbonate polymers on which these plastics are based, are in the range from about 20,000 to 60,000, preferably 20,000 to 40,000 and can be determined by gel permeation chromatography or by a light scattering method, for example. The Vicat softening temperatures, (VET) of these polymers, measured according to DIN 53460, are about 140° C. to 160° C.

The PC plastic can be used for the production of the plastic objects of the invention in prefabricated form, for example in the form of solid panels, in the form of hollow-chamber panels, in the form of domes, or in the form of practically any conceivable shape, with the protective film then being applied preferably by varnishing. For the molded parts of the invention to be prepared by coextrusion, the polycarbonates and the methacrylate film, comprising components (A) and (B) to be applied to protect them, can be in the usual form and quality suitable for extrusion, for example granulates or powders.

PC plastics that can be used to produce the plastic objects of the invention are compatible polymer blends that consist predominantly, i.e., 99.9 to 80 wt. %, of an aromatic polycarbonate, preferably the polycarbonate of Bisphenol A, and 0.1 to 20 wt. %, of one or more methacrylate copolymers (B) that are completely compatible with the aromatic polycarbonate, as stated above.

The methacrylate copolymer (B)

The methacrylate copolymer (B), which provides durable UV protection to the polycarbonate plastic from the UV absorber contained in the copolymer film, contains 99.9 to 5 wt. %, preferably 95 to 20 wt. %, and especially preferably 90 to 40 wt. %, of methyl methacrylate, and also contains 0.1 to 95 wt. %, preferably 5 to 80 wt. %, and especially preferably 10 to 60 wt. %, of (meth)acrylic esters of Formula I with the ester groups $R_1$ and/or N-substituted (meth)acrylamides of Formula II with the substituents $R_2$ and/or N-substituted maleimides of Formula III with the substituents $R_3$ as comonomers.

The groups $R_1$, $R_2$, and $R_3$, all contain carbocyclic groups, i.e., cycloaliphatic and aromatic groups, that are bonded to the polymerizable (meth)acrylic group either directly through the functional oxygen or nitrogen atom or through a spacer group (see A in Formula I).

The copolymer may contain other units of α,β-unsaturated monomers in amounts of 0 to 40 wt. %, preferably in amounts of 2.5 to 40 wt. %, and especially preferably in amounts of 5 to 35 wt. %, such as styrene, α-methylstyrene, methacrylic acid or acrylic acid, or their alkyl esters with up to 10 carbon atoms in the ester group, in which the alkyl groups may also be branched.

These statistical copolymers are prepared by known procedures for the polymerization of α,β-unsaturated compounds, preferably radical polymerization, for example in bulk or in solution, or by suspension or emulsion polymerization. Radical polymerization initiators that can be used for this purpose are azo compounds such as azobisisobutyronitrile, or peroxides such as dibenzoyl peroxide, dilauroyl peroxide, redox systems, or the initiating radicals can be produced by radiation chemistry (See H. Rauch-Puntigam, Th. Völker "Acryl-und Methacrylverbindungen", Springer Verlag 1967).

It is well known that the compatibility of polymers in blends depends on their degrees of polymerization. Specifically, the compatability as a rule decreases with increasing molecular weight of the polymers, with the mixture then becoming two-phased or multiple-phased. To produce the multilayered polycarbonate-polymethacrylate objects of the invention, methacrylate copolymers are used that have molecular weights (M$_W$), in grams per mole, as can be determined by gel permeation chromatography or by light-scattering methods, for example, above 30,000, generally from about 30,000 to 250,000, preferably about 50,000 to 150,000, and whose reduced viscosities $\eta_{spec}/c$, measured according to DIN 51562 in chloroform as solvent, are in the range of 18 to 65 ml/g, preferably in the range of 30 to 50 ml/g. Such molecular weight-controlled copolymers are prepared preferably by polymerization in the presence of transfer regulators, such as mercaptans which are known for this purpose (see Houben-Weyl, Methoden der Organischen Chemie, Volume XIV/1, 1961, page 66).

Thus, for example, methyl methacrylate copolymers with 5 to 50 wt. % cyclohexyl methacrylate and a $\eta_{spec}/c$ of 40 to 45 ml/g are compatible over the entire range of mixing ratios with Bisphenol A polycarbonate, for example Makrolon ®1189, which has a $\eta_{spec}/c$ of 43 ml/g (measured in chloroform). Methacrylate resins of 100 wt. % phenyl methacrylate or those containing predominantly phenyl methacrylate are likewise compatible over the entire mixture range with Bisphenol A polycarbonate, for example Makrolon ® 1189 or Makrolon ® 3100.

Further, methyl methacrylate copolymers with 6 to 15 wt. % N-cyclohexylmaleimide and a $\eta_{spec}/c$ of 33 ml/g (measured in chloroform), are compatible over the entire mixing range with Bisphenol A polycarbonate, for example Makrolon ® 1189, which has a $\eta_{spec}/c$ of 43 ml/g.

The methacrylate copolymers (B) compatible with polycarbonate can be processed thermoplastically as such to obtain glass-clear, colorless molded objects that have Vicat softening temperatures (VET) measured according to DIN 53460, from approximately 100° to 130° C. in the case of the copolymers with comonomers of Formula I, and from about 110° to 150° C. as copolymers with comonomers of Formula II or III. The methacrylate copolymers (B) have outstanding adhesion at topcoats on polycarbonate plastic objects.

The methacrylate copolymers (B) of the invention are distinguished as protective films for polycarbonate plastics because of their good adhesion The copolymers form compatible mixtures with the polycarbonate according to the criteria of the "Transition Temperature Method" and of the "Optical Method" as required for compatible polymer blends and described in the chapter "Compatible Polymers" in Polymer Handbook, Second Edition, copyright C 1975, by John Wiley & Sons; III, 211. These compatible blends can also be characterized further by their LCST behavior (D. R. Paul, Polymer Blends and Mixtures, 1985, pp. 1 to 3; Martinus Nijhoff Publishers, Dordrecht, Boston Lancaster; Kirk-Othmer, 3rd Ed. Vol. 18, pp. 443–478, J. Wiley 1982), by the fact that they have a lower critical solution temperature of $\geq 120°$ c., preferably $\geq 150°$ C. For the purpose of determining the LCST, the cloud point $T_{Tr}$ (turbidity temperature) is determined experimentally, for example on a Kofler heating plate (Chem. Ing.-Technik 1950, p. 289), which characterizes the homogeneous to heterogeneous phase transition of the blend which depends on the qualitative and quantitative blend composition.

For example, for PC/B blends with ratios by weight PC:B of 99.9-95:0.1-5, the cloud points $T_{Tr}$ are $>260°$ C. when (B) contains comonomers of Formula I, and $>200°$ C. when (B) contains comonomers of Formula II or III.

The topcoat layer comprising (A) and (B) containing UV absorber is applied by otherwise familiar techniques by coextrusion or varnishing in film thicknesses of about 1 to 500 μm, as a rule from 1 to 100 μm, especially in film thicknesses up to about 50 μm. Conventional multiple-part slit nozzles are used in the extrusion technique. Extrusion is done generally at temperatures between 240° and 300° C. In varnishing, solvents have to be used in which the system (A)+(B) is soluble. 1-Methoxy-2-propanol can be used for this purpose, for example.

The UV absorber (A)

The polymethacrylate film contains a UV absorber with a molecular weight M$_W \leq 5000$, in amounts of 0.01 to 50 wt. %. Suitable UV absorbers are 2-hydroxy-4-n-octoxybenzophenone, 2-hydroxy-4-methoxybenzophenone, 2-(2'-hydroxy-5'-methylphenyl)benzotriazole, as well as other derivatives of 2-hydroxybenzophenone, or of benzotriazole, also 2,4-dihydroxybenzoylfuran, phenyl salicylate, resorcinol disalicylate, resorcinol monobenzoate and dibenzoate, benzyl benzoate, stilbene, β-methylumbelliferone, and its benzoate Numerous other UV absorbers are known and available on the market. Particularly preferred are UV absorbers of low volatility at the processing temperature, i.e., those with the highest possible molecular weight. The UV absorber should be as homogeneously miscible as possible in the polymethacrylate film at the chosen concentration. The core containing PC can be completely free of UV absorbers or can contain them in distinctly lower concentration than the topcoat. A concentration of UV absorber in the core of 0.5 wt. % is generally not exceeded.

Suitable homogeneously miscible UV absorbers with molecular weights $\leq 5000$ and of low volatility are also those that contain several UV-absorbing structural components in their molecular structure, optionally of differing chemical structures. Such oligomers can be obtained by known polycondensation reactions of polyfunctional starting materials, or by polymerization reactions of known polymerizable UV absorbers (see for example U.S. Pat. No. 4,576,870), or by copolymerization of other conventional comonomers. By setting suitable condensation conditions and polymerization conditions (for example, amounts of initiator, amount of chain transfer regulator), molecular weights $\leq 5000$ can be produced.

Polymerizable UV absorbers such as 2-(2'-hydroxyphenyl)-5-methacryloylamidobenzotriazole or 2-hydroxy-4-methacryloxybenzophenone, however, can also be used in the polymethacrylate film (B) in their monomeric form as low molecular weight UV absorber additives (A). (See Houben-Weyl, 4th Edition, Vol. 15, pp. 256-260, Verlag Chemie).

The multilayered plastic objects of the invention based on polycarbonate are used particularly outdoors, for example as glazing and structural elements, where they are exposed to sunlight and the prevailing weather conditions. Weathering tests, such as the Xenotest (Chem. Rdsch. 27, 1974, No. 14, pp. 2 to 7) or the QUV test (DIN 53387), and the hail exposure test, show the clear superiority of the new materials of the present invention over comparison materials known in the art. The hail exposure test is used to examine materials for their hail impact strength, since severe damage from hail impact has occurred in the past when using materials of lower hail resistance, for example in greenhouse construction. Damage to the plastic caused by UV radiation is prevented by the present invention, and therefore other destructive influences such as hail impact no longer cause significant damage.

The hail impact test is a nonstandard, company proprietary test in which, for example, panels are bombarded with polyamide balls of various sizes and various kinetic energies. (J. Hennig, J. Lehmann. G. Zaengler, Angew. Makromol, Chemie 158/159, p. 301-311, 1988).

Other measurable parameters for surface characterization and thus for determination of the benefits of the invention are determination of surface roughness with a Perthometer according to DIN 4768, determination of surface gloss as a reflectometer value according to DIN 67530, yellowing by the method of DIN 6167, and determination of the film thickness of the film containing the UV absorber, for example by the method of U.S. Pat. No. 4,477,521.

Having generally described this invention, a further understanding can be obtained by reference to certain specific examples which are provided herein for purposes of illustration only and are not intended to be limiting unless otherwise specified.

EXAMPLES

A Preparation of the Methacrylate Copolymers

Example 1

0.2 parts by weight of dilauroyl peroxide as initiator and 0.6 parts by weight of dodecyl mercaptan as molecular weight regulator were added with stirring to a mixture of 95 parts by weight of methyl methacrylate (MMA) and 5 parts by weight of phenyl methacrylate (PhMA). This solution was polymerized in a film tube for 3 h at 55° C. and for 16 h at 50° C., and was tempered in a drying oven for 3 h at 110° C. for the final polymerization. The polymer was colorless and transparent. The average molecular weight was found to be $M_W = 78,000$ and the glass transition temperature Tg was found to be 107° C.

Example 2

A blend of 90 parts by weight of MMA and 10 parts by weight of PhMA was polymerized by the method of Example 1 with 0.2 parts by weight of dilauroyl peroxide and 0.55 parts by weight of dodecyl mercaptan. The colorless and transparent polymer had an average molecular weight $M_W$ of 70,000 and a glass transition temperature Tg of 108° C.

Example 3

In a mixture of 50 parts by weight of MMA and 50 parts by weight of PhMA were dissolved 0.2 parts by weight of dilauroyl peroxide as initiator and 0.55 parts by weight of dodecyl mercaptan as molecular weight regulator. The solution was polymerized by the method of the preceding examples in a water bath for 18 h at 50° C. and for 22 h at 60° C., and was tempered for 3 h at 110° C. for the final polymerization. The polymer was colorless, transparent, had an average molecular weight of $M_W = 82,000$, and had a glass transition temperature Tg of 110° C.

Example 4

0.4 parts by weight of t-butyl pivalate, 0.1 parts by weight of 2,2'-azobisisobutyronitrile, 0.37 parts by weight of dilauroyl peroxide, and 0.05 parts by weight of 2,2'-bis(t-butylperoxy)butane were added as initiators to a mixture of 70 parts by weight of MMA, 20 parts by weight of PhMA, and 10 parts by weight of α-methylstyrene, and 0.55 parts by weight of dodecyl mercaptan was added as molecular weight regulator. The solution was polymerized in a water bath in a film tube for 65 h at 60° c., and for 90 h at 65° C., and was tempered for 12 h at 110° C. for the final polymerization. The polymer was colorless and completely clear. The average molecular weight was found to be $M_W = 87,000$ and the glass transition temperature was found to be Tg = 114° C.

Example 5

A mixture of 80 parts by weight of MMA, 10 parts by weight of PhMA, and 10 parts by weight of n-butyl methacrylate was polymerized by the method of Example 1 with 0.2 parts by weight of dilauroyl peroxide and 0.5 parts by weight of dodecyl mercaptan. The colorless and transparent polymer had an average molecular weight $M_W = 79,000$ and a glass transition temperature Tg = 102° C.

Example 6

0.2 parts by weight of dilauroyl peroxide and 0.65 parts by weight of dodecyl mercaptan were added with stirring to a mixture of 95 parts by weight of MMA and 5 parts by weight of cyclohexyl methacrylate (CHMA). This solution was polymerized in a film tube in a water bath for 3 h at 55° C. and for 16 h at 50° C., and was tempered at 125° C. for 10 h for the final polymerization. The polymer was colorless, transparent, had an average molecular weight MW = 78,000, and had a glass transition temperature Tg = 106° C.

Example 7

0.2 parts by weight of dilauroyl peroxide and 0.6 parts by weight of dodecyl mercaptan were dissolved in a mixture of 90 parts by weight of MMA and 10 parts by weight of CHMA. This solution was polymerized by the method of Example 6 and then tempered for the final polymerization. The polymer thus obtained was colorless and transparent. The average molecular weight was found to be M$w$=81,000 and the glass transition temperature was found to be Tg=107° C.

Example 8

0.2 parts by weight of dilauroyl peroxide and 0.55 parts by weight of dodecyl mercaptan were dissolved in 80 parts by weight of MMA and 20 parts by weight of CHMA. The mixture was polymerized in a film tube in a water bath for 12 h at 50° C. and tempered for 10 h at 110° C. for the final polymerization. The average molecular weight of the completely colorless and transparent polymer was MW=83,000 and its glass transition temperature Tg=110° C.

Example 9

6 parts by weight of cyclohexylmethacrylamide, 0.2 parts by weight of dilauroyl peroxide, and 0.51 parts by weight of dodecyl mercaptan were dissolved in 94 parts by weight of MMA. This mixture was polymerized in a film tube for 24 h at 50° C. and tempered for 10 h at 110° C. for the final polymerization. The polymer was yellowish and transparent. The average molecular weight was found to be MW=100,000.

B. Preparation of the Varnish Films on Polycarbonate (PC)

Examples 10 to 15—Preparation of the Varnishes

The polymers prepared in Examples 1-3 and 6-8 were ground and dissolved with a low molecular weight UV absorber in a common solvent. The precise formulation was: 80 parts by weight of 1-methoxy-2-propanol, 14 parts by weight of a polymer from Examples 1-3 and 6-8, and 6 parts by weight UV absorber Cyasorb ® 531 (Cyanamid). Cyasorb ® 531 is a benzophenone derivative with the following structure.

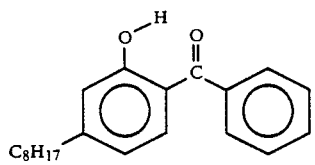

The varnish formulation was coated on a flat polycarbonate panel with a 15 μm doctor blade, corresponding to a dry film thickness of about 3 μm.

C. Preparation of Coextrusion Films

Examples 16 to 18

The polymers prepared according to Examples 4, 5, and 9 were ground, compounded in a drum mixer with low molecular weight UV absorber, and extruded and granulated in a second compounding step. The precise formulation was 90 parts by weight of a polymer from Examples 4, 5, and 9, and 10 parts by weight UV absorber Tinuvin ® 234 (Ciba-Geigy). Tinuvin ® 234 is a benzotriazole derivative with the following structure.

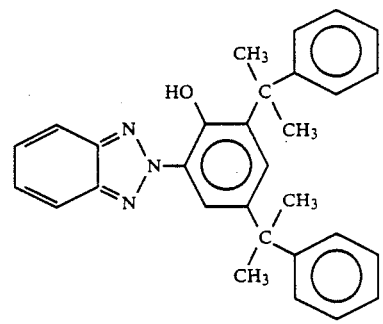

The formulation given above was applied to polycarbonate double skin sheets with a multiple-channel nozzle. The thickness of the coextrusion film was 10-30 μm.

D. Weathering and Fracture Properties of the coated PC Substrates from Examples 10 to 18

Examples 19-27

7 Weathering data (weathering in a Xenotest and QUV test) and data from the hail impact test (kinetic energies of the polyamide balls at failure of the PC substrate) were compared in the table below to PC coated with a conventional composition (Comparison Example A) and uncoated PC (Comparison Examples B). The kinetic energies in joules (J) of the hail impact test indicated are the values above which damage can be found to the surface of the coated or uncoated PC without weathering.

TABLE 1

| | | UV-Protective Coatings for Polycarbonate | | |
|---|---|---|---|---|
| Example | Coating from Example No. | Xenotest (Weathering in [h], + = unchanged surface) | QUV Test (Weathering in hrs, + means unchanged surface) | Hail Impact Test (kinetic energy, as received) |
| 19 | 10 | 5000+ | 1000+ | ≧10 |
| 20 | 11 | 5000+ | — | ≧10 |
| 21 | 12 | 5000+ | 1000+ | ≧10 |
| 22 | 13 | 5000+ | 1000+ | ≧10 |
| 23 | 14 | 5000+ | 1000+ | ≧10 |
| 24 | 15 | 5000+ | 1000+ | ≧10 |
| 25 | 16 | 5000+ | — | ≧10 |
| 26 | 17 | 1000+ | — | ≧15 |
| 27 | 18 | 5000+ | — | ≧4 |
| Comparison Example A | PMMA + 10% Tinuvin ® 234 (Varnish coating) | 4000+ | 1000+ | ≧3 |
| B | Makrolon ® uncoated | 500+ 1000: | — | ≧2 (as received) Values after about |

TABLE 1-continued

UV-Protective Coatings for Polycarbonate

| Example | Coating from Example No. | Xenotest (Weathering in [h], + = unchanged surface) | QUV Test (Weathering in hrs. + means unchanged surface) | Hail Impact Test (kinetic energy, as received) |
|---|---|---|---|---|
| | | light yellow tinge | | 4000 h Xeno weathering drop to about 1 |
| | | 2000: distinct yellow tinge 4000: strong yellow tinge Surface crazed and dull | | |

Obviously, numerous modifications and variations of the present invention are possible in light of the above teachings. It is therefore to be understood that within the scope of the appended claims, the invention may be practiced otherwise than as specifically described herein.

What is claimed as new and desired to be secured by Letters Patent of the United States is:

1. A multilayered object comprising:
a core aromatic polycarbonate layer comprising more than 50 wt. % of an aromatic polycarbonate and a thermoplastic polymethacrylate film containing a UV absorber in contact with said core layer, wherein said film comprises
(A) 0.01–50 wt. % of a UV absorber having a molecular weight $M_w \leq 5,000$, and
(B) 99.99–50 wt. % of a methacrylate copolymer comprising
(b1) 99.9–5 wt. % methacrylate monomer units and 0–40 wt. % monomer units of an $\alpha,\beta$-unsaturated copolymerizable monomer, and
(b2.1) 0.1–95 wt. % acrylic and or methacrylic ester monomer units from monomers of the formula I:

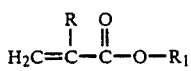
(I)

wherein R is hydrogen or methyl, and $R_1$ is Y or A-Y, wherein Y is a $C_{5-12}$ cycloalkyl group or a cycloalkyl group having 5–12 carbon atoms substituted with one or more alkyl groups, a $C_{6-12}$ aryl or a $C_{6-12}$ alkyl-substituted or oxyalkyl-substituted aryl group, and wherein A is a $C_{1-6}$ straight chain or branched alkylene group or a $C_{2-4}$ oxyalkylene group, or
(b2.2) 0.1–95 wt. % of monosubstituted (methy)acrylamide monomer units from monomers of the formula II:

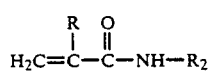
(II)

wherein R is hydrogen or methyl and $R_2$ is a $C_{5-12}$ unsubstituted or substituted cycloalkyl or aryl group, or
(b2.3) 0.1–95% wt. % of maleimide units from monomers of the formula III:

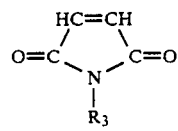
(III)

wherein $R_3$ is an unsubstituted cycloalkyl group or a cycloalkyl group substituted with one or more $C_{1-6}$ alkyl groups or substituted with a phenyl group,
or mixtures of any of b2.1, b2.2 and b2.3, and
wherein $R_1$, $R_2$ and $R_3$ have no substantial absorption for visible light down to ultraviolet radiation of 340 nm wavelength and wherein a mixture of said aromatic polycarbonate and copolymer (B) are compatible at all mixing ratios.

2. The object of claim 1, wherein said polycarbonate core comprises a compatible polymer blend containing 99.9–80 wt. % of an aromatic polycarbonate and a 0.1–20 wt. % of one or more methacrylate copolymers (B).

3. The object of claim 1, wherein said methacrylate copolymer comprises 95–20 wt. % methyl methacrylate monomer units.

4. The object of claim 1, wherein said methacrylate copolymer comprises 5–80 wt. % monomer units from monomers having Formula I.

5. The object of claim 1, wherein said methacrylate copolymer comprises 5–25 wt. % monomer units from monomers having Formula II.

6. The object of claim 1, wherein said methacrylate copolymer comprises 5–40 wt. % maleimide monomer units from monomers having formula III.

7. The object of claim 1, wherein said methacrylate copolymer has a molecular weight greater than or equal to 30,000.

8. The object of claim 7, wherein said methacrylate copolymer has a molecular weight of about 30,000–250,000.

9. The object of claim 1, wherein a mixture of said aromatic polycarbonate and methacrylate copolymer exhibits a lower critical solution temperature of greater than or equal to 120° C.

10. The object of claim 9, wherein said mixture exhibits a lower critical solution temperature greater than or equal to 150° C.

11. The object of claim 1, wherein said $\alpha,\beta$-unsaturated copolymerizable monomers are selected from the group consisting of styrene, $\alpha$-methylstyrene, methacrylic acid, acrylic acid and $C_{1-10}$ alkyl esters of methacrylic acid or acrylic acid.

12. The object of claim 1, further comprising at least one topcoat layer in contact with said polymethacrylate film.

13. The object of claim 12, wherein said additional topcoat layer comprises polymethylmethacrylate.

14. A method for producing the multilayered objects of claim 1, comprising applying said polymethacrylate film containing said UV absorber to said polycarbonate core such that said polymethacrylate film has a thickness of 1–500 microns.

15. The process of claim 14, wherein said polymethacrylate film has a thickness of 1–50 microns.

* * * * *